US005166590A

United States Patent [19]

Tu et al.

[11] Patent Number: 5,166,590

[45] Date of Patent: Nov. 24, 1992

[54] METHOD AND CIRCUIT FOR FEEDING A SINGLE-PHASE STEPPING MOTOR

[75] Inventors: Mai X. Tu, Ecublens; Michel Schwab, Bienne, both of Switzerland

[73] Assignee: Detra SA, Bienne, Switzerland

[21] Appl. No.: 653,282

[22] Filed: Feb. 11, 1991

[30] Foreign Application Priority Data

Feb. 23, 1990 [EP] European Pat. Off. ........... 90810137

[51] Int. Cl.[5] ............................................. G05B 19/40
[52] U.S. Cl. .................................................... 318/685
[58] Field of Search ............... 318/696, 685, 138, 293, 318/254, 599; 368/157, 160; 363/96

[56] References Cited

U.S. PATENT DOCUMENTS 3,364,413 1/1968 Abraham .............................. 363/96
3,969,642 7/1976 Yoshino ........................... 310/49 R
4,361,410 11/1982 Nakajima et al. ................... 368/157
4,439,717 5/1984 Berney ............................... 318/696
4,516,064 5/1985 Oudet et al. ........................ 318/696
4,542,329 9/1985 Tu Xuan ............................ 318/696

FOREIGN PATENT DOCUMENTS 672572 6/1990 Switzerland .
2006995 5/1979 United Kingdom .

*Primary Examiner*—William M. Shoop, Jr.
*Assistant Examiner*—Brian Sircus
*Attorney, Agent, or Firm*—Oliff & Berridge

[57] ABSTRACT

The method and circuit are particularly suitable for use in timepieces and are adapted to supply the motor with chopped-voltage pulses of variable durations as a function of the load conditions of the motor. A chopped pulse of variable duration $T_7$ is composed of a partial pulse $T_4$ of fixed duration and of a constant number of partial pulses $T_{6i}$ of variable duration, spaced by intervals $T_{5i}$ which are themselves determined by the duration of current drop between the preceding peak and a reference value. The durations $T_{6i}$ are proportional to the intervals $T_{5i}$.

10 Claims, 6 Drawing Sheets

METHOD AND CIRCUIT FOR FEEDING A SINGLE-PHASE STEPPING MOTOR

Figure 1:
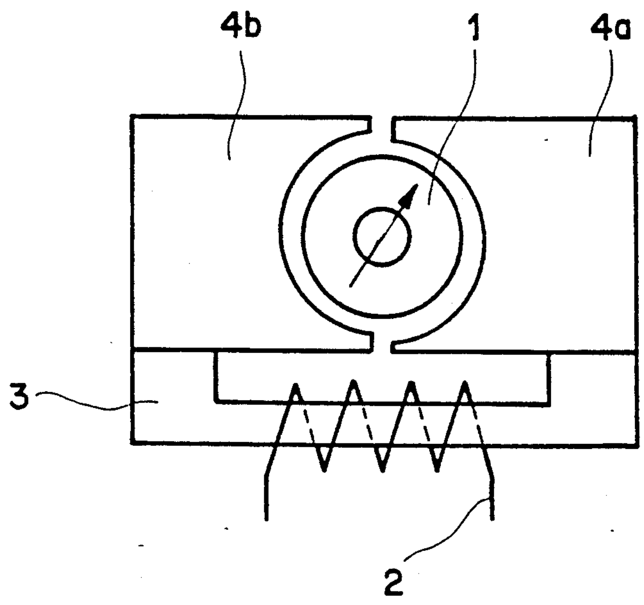

Cross-reference is made to U.S. patent application Ser. No. 07/719,060, which is a continuation of U.S. patent application Ser. No. 07/357,815 (now abandoned), to the present inventors.

This invention relates to the supply of power to motors, and more particularly to a method and circuit for feeding a single-phase stepping motor for a timepiece, of the type adapted to supply the motor with chopped-voltage pulses of variable duration as a function of the load conditions and as a function of the feed voltage of the motor.

Several types of feed for stepping motors of quartz watches have been disclosed. U.S. Pat. No. 3,969,642 (CH 634,194) describes a method in which the motor is fed by a pulse of constant duration and amplitude. A drawback of this method is high power consumption, for the feed pulse is not adapted to the actual load of the motor. Other solutions have been proposed, permitting the feed of the motor to be adapted as a function of the load. A feeding method, has been described in U.S. Pat. No. 4,542,329 (French Patent No. 2,529,032 [Application No. 7916816]); however, this solution has the drawback of having to use an analog missed-step detection circuit and a rather complicated logical correction circuit. In the former published Swiss application of the same inventors, No. 672,572 GA3 (JP-A- 2,036,799), a new method of feeding is proposed. This method permits supplying the motor with voltage pulses of variable duration as a function of the load. This result is obtained by using relatively simple means. Recent tests of this manner of feeding have led to the conclusion that it is possible to improve this method in order to reduce the power consumption of the motor.

It is an object of this invention to provide an improved method and circuit for feeding a stepping motor which permit a greater saving on power consumption to be achieved with equally simple means.

To this end, in the feeding method of the present invention, of the type initially mentioned, each pulse of chopped voltage is composed of a first partial voltage pulse of predetermined duration and of a train of second partial voltage pulses of the same polarity as that of the first partial pulse and of variable durations, the intervals of time separating the partial voltage pulses being variable as a function of the load conditions and as a function of the feed voltage of the motor, and the duration of each second partial pulse being proportional to the interval of time which precedes it.

The control circuit for a single-phase stepping motor according to the present invention comprises a plurality of feeding terminals; a plurality of motor terminals; a plurality of switches; connection means including said switches for connecting the motor terminals to the feeding terminals, wherein the connection means commutates the motor between an off-state and at least one on-state by controlling the states of the switches; time counting means for providing main pulse periods succeeding one another with a fixed frequency and auxiliary periods having a predetermined length, this predetermined length being a fraction of the length of the main pulse periods; a sensor used for sensing a load parameter of the motor; a comparator coupled to the sensor whereby the comparator provides a signal for commutating the motor to the on-state when a threshold value exceeds the load parameter; and controller means operatively coupled to the switches for providing a plurality of elementary pulses during each of the main pulse periods, the elementary pulses comprising a first elementary pulse having a length which is that of the auxiliary periods, and a predetermined number of second elementary pulses separated from one another and from the first elementary pulse through time intervals, these time intervals having a variable length determined by the comparator, said second elementary pulses having each a length proportional to the preceding time interval, the motor being in an on-state during each of the first and second elementary pulses and being in an off-state during the aforementioned time intervals and during a residual period of the main pulse period, between the end of the last one of the second elementary pulses and the beginning of the next first elementary pulse.

Figure 2:
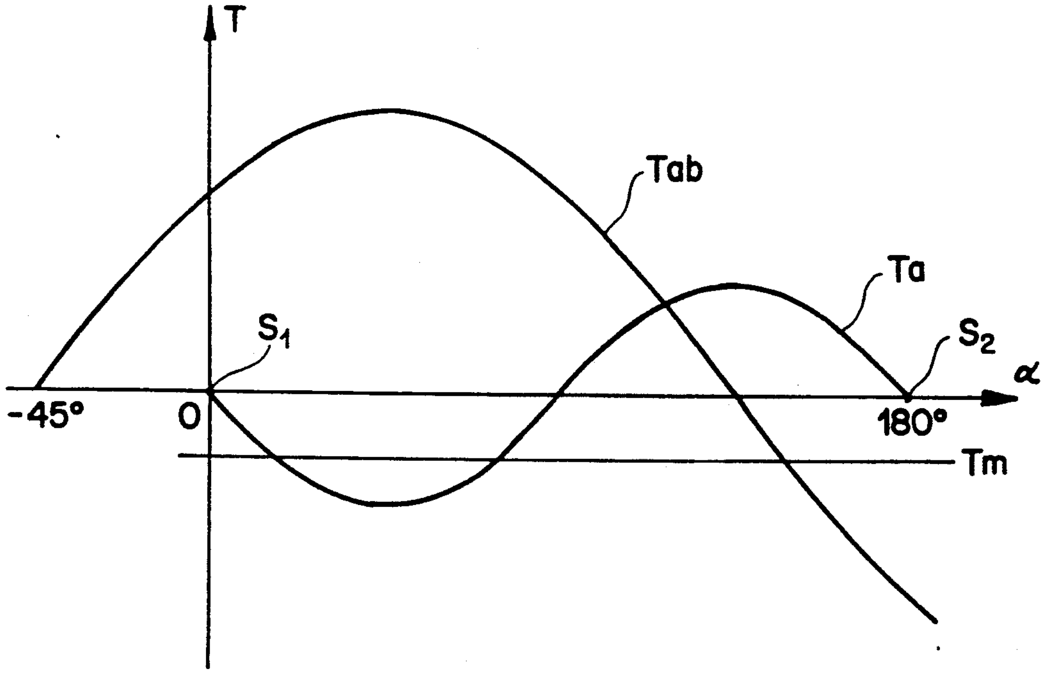
Figure 3:
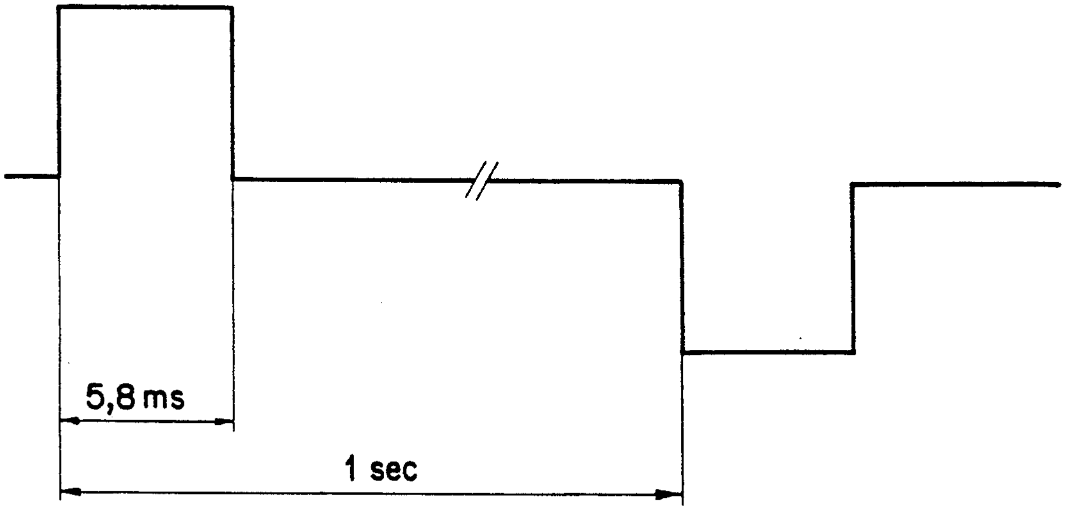
Figure 5:
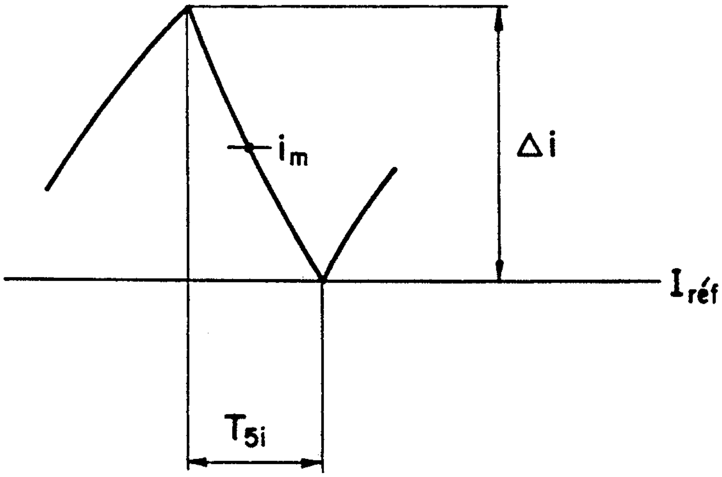
Figure 4A:
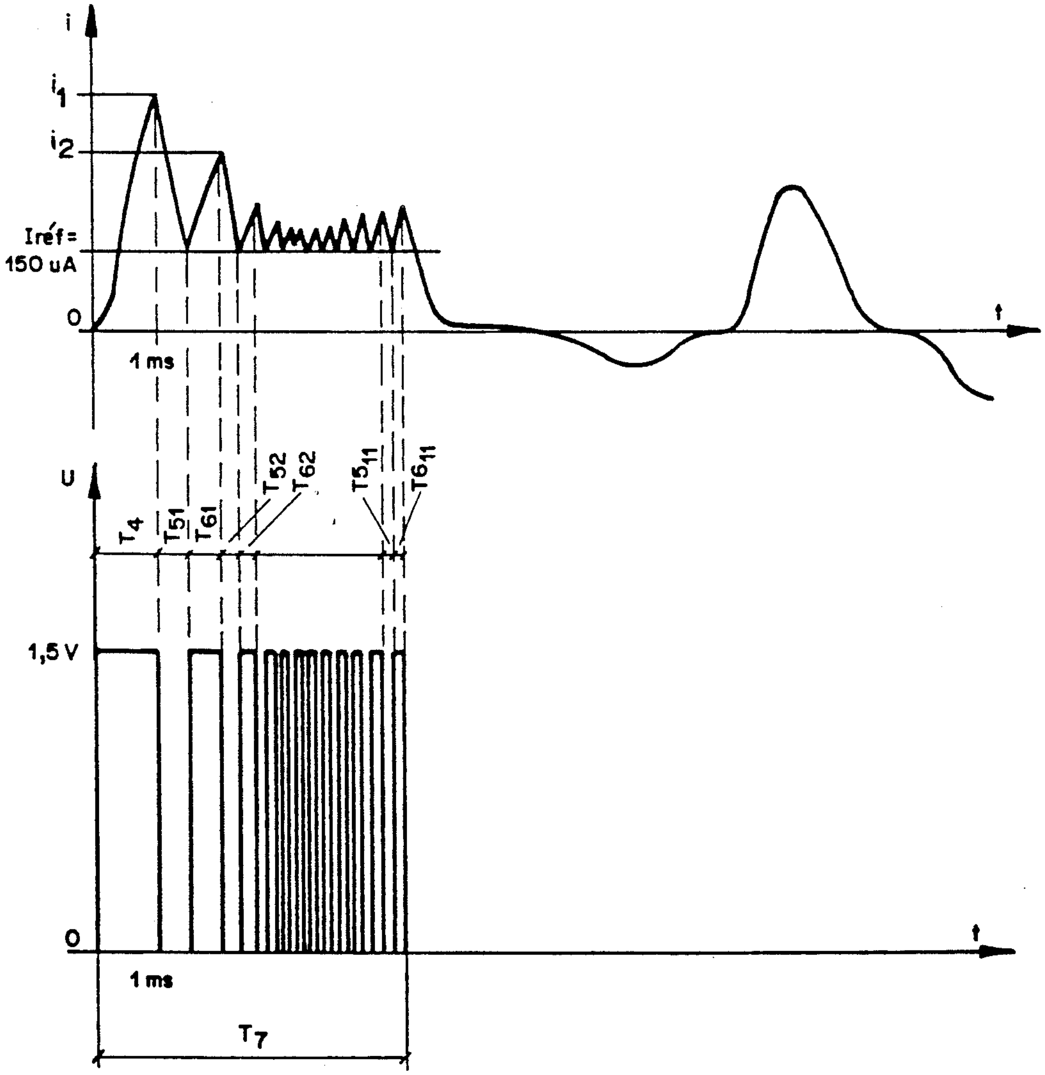
Figure 4B:
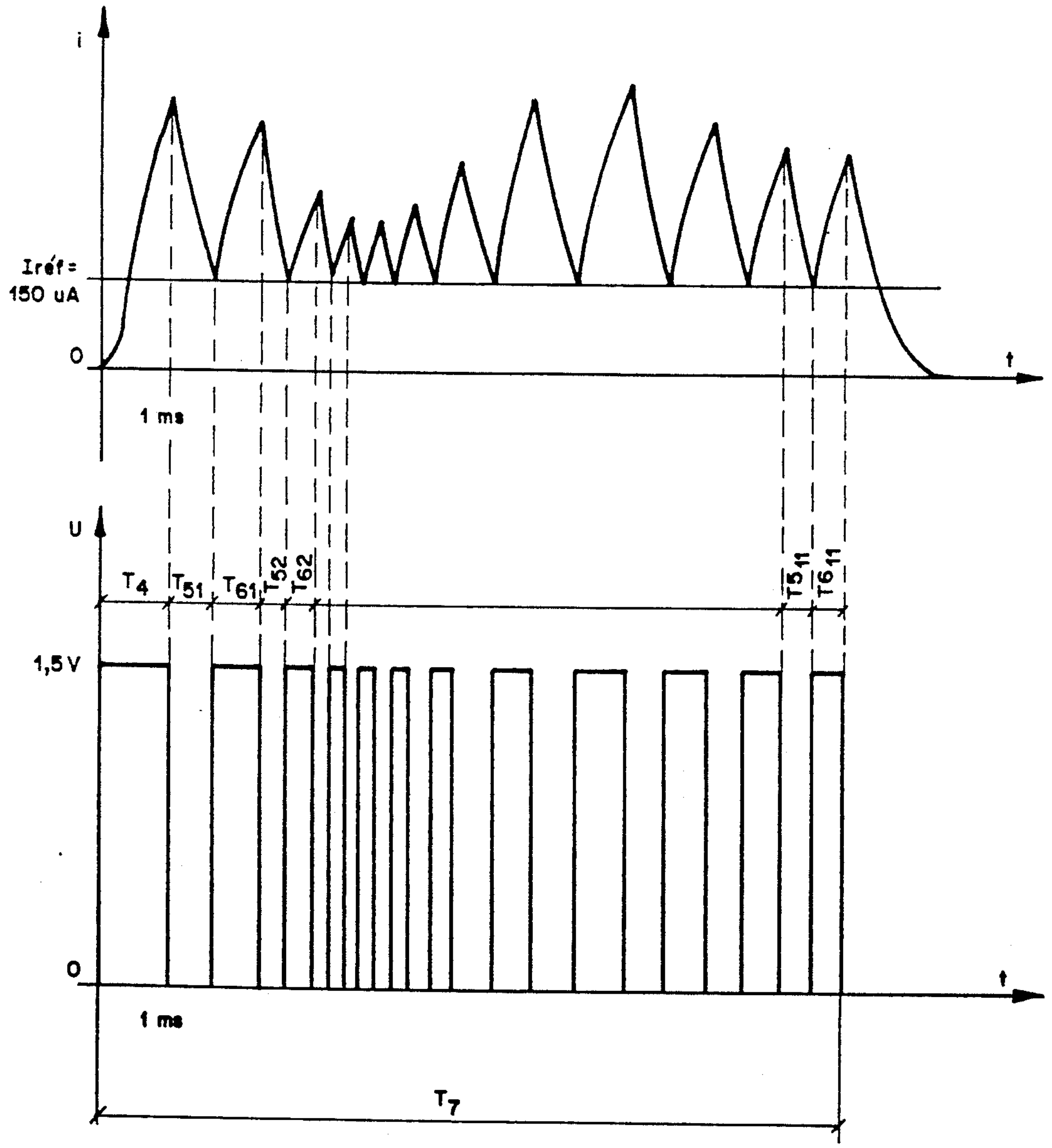
Figure 6:
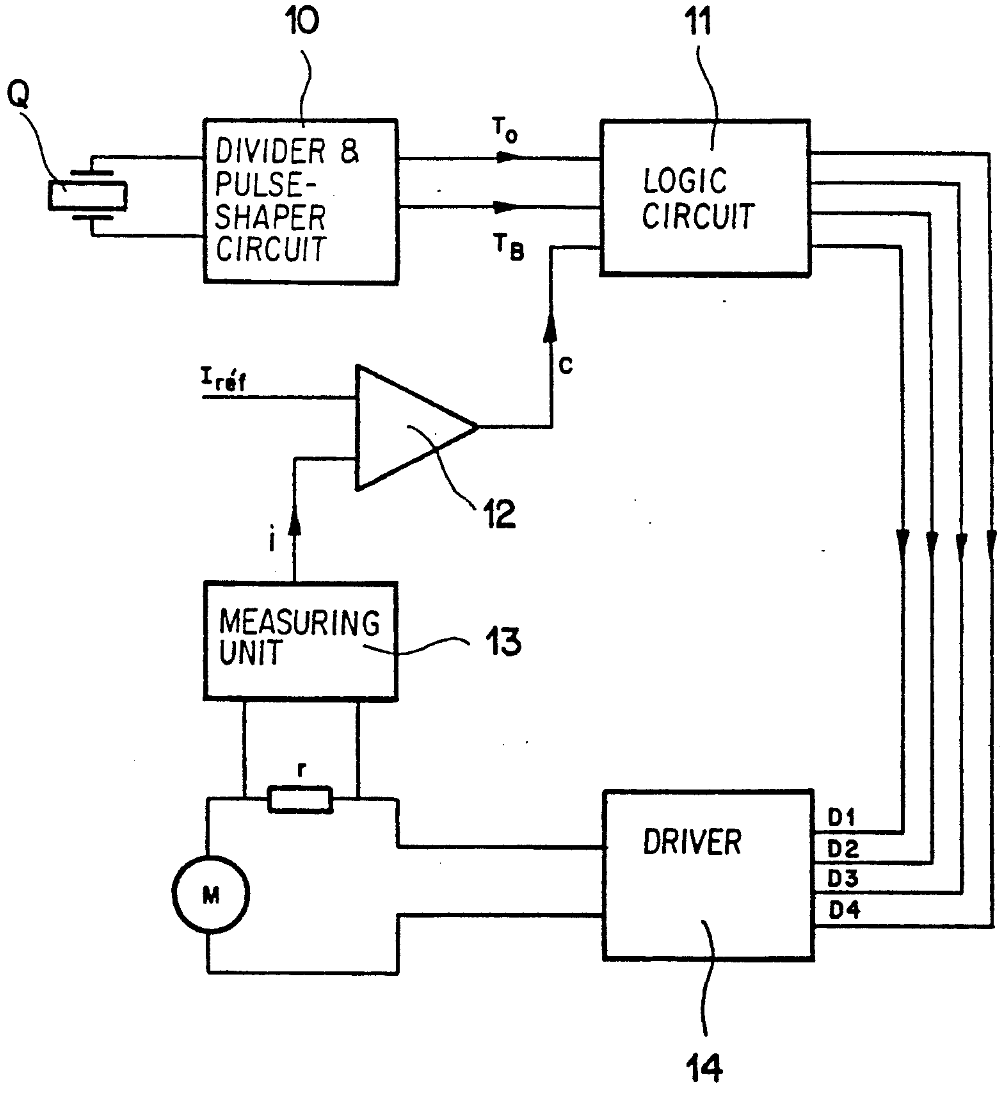
Figure 7:
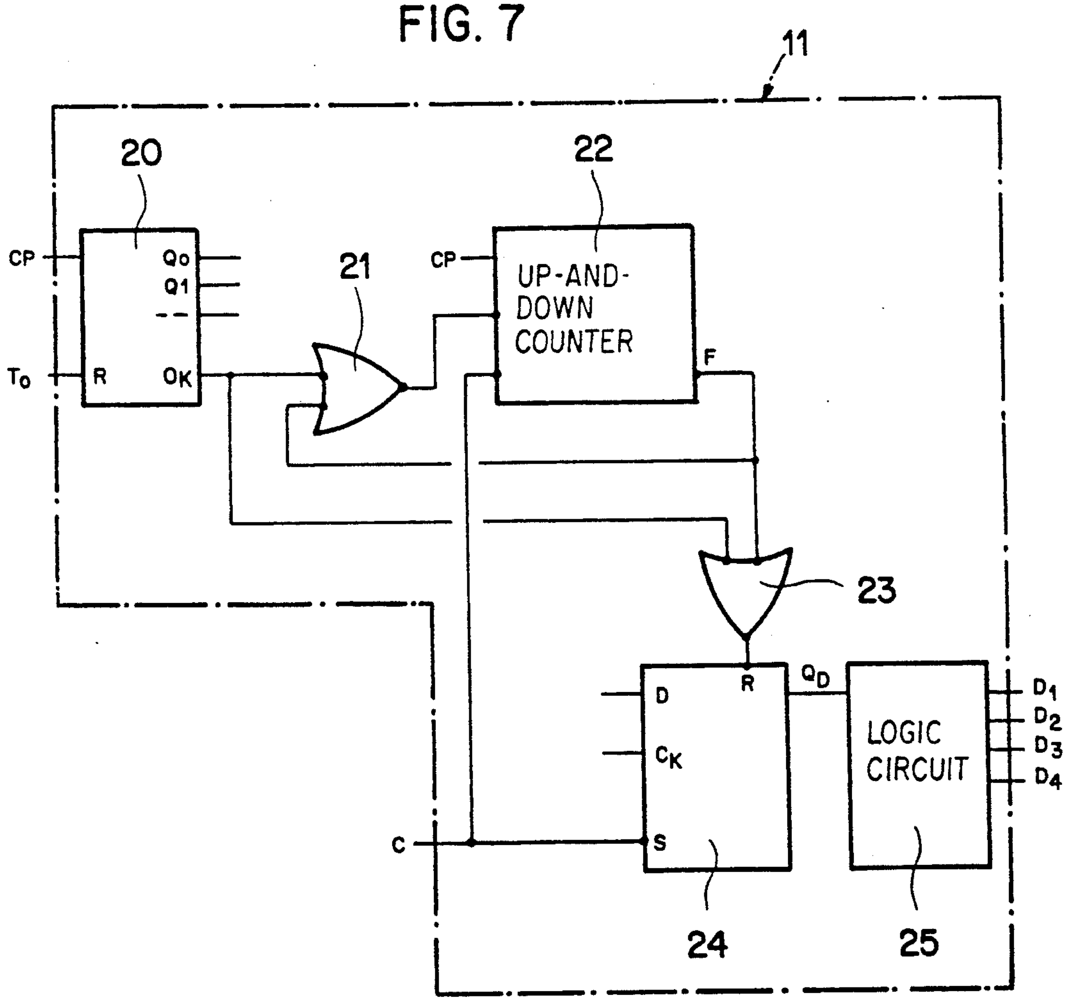
Figure 8:
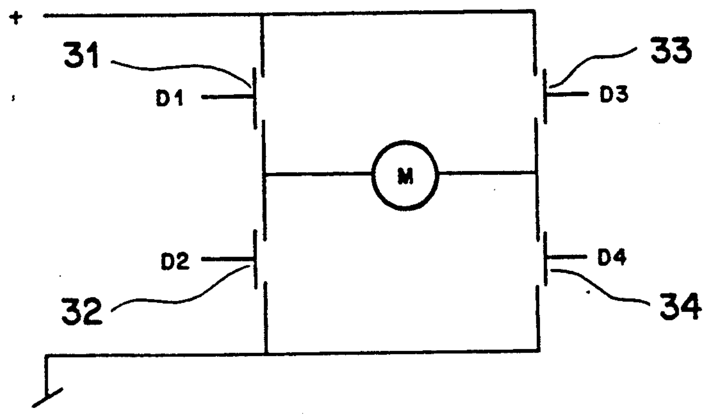

Preferred embodiments of the invention will now be described in detail with reference to the accompanying drawings, in which:

FIG. 1 is a basic diagram of a stepping motor of the single-phase, double-pole type, FIG. 2 is a graph of static torques of a stepping motor of the aforementioned type, FIG. 3 is a diagram of one type of feed pulses of this motor, FIG. 4*a* a graph showing the current and the voltage applied to the motor according to the inventive feeding method, the motor not being loaded by any mechanical torque, FIG. 4*b* is a graph showing the current and the voltage applied to the motor according to the same method as in FIG. 4*a*, but with the motor being loaded by a mechanical torque, FIG. 5 is a graph showing the variation of the current during an interval of time $T_{5i}$ separating two partial pulses, FIG. 6 is a block diagram of an embodiment of the inventive method, and FIGS. 7 and 8 are respective details of the diagram of FIG. 6.

FIG. 1 illustrates diagrammatically a basic design of a single-phase, double-pole stepping motor. This motor is composed of a rotor comprising a cylindrical, diametrically magnetized permanent magnet 1, a stator comprising a coil 2, a coil core 3, and pole pieces 4*a* and 4*b* made of a soft ferromagnetic material.

FIG. 2 shows the torques acting upon rotor 1 of the motor as a function of the angular position. The positioning torque $T_a$ is due to the interaction between the magnet and the geometry of the stator pole pieces. Mutual torque $T_{ab}$ is due to the interaction between the field of the magnet of rotor 1 and the field created by the coil when it is fed. Torque $T_m$ represents the sum of all the torques of mechanical origin acting upon the rotor. FIG. 2 shows that torques $T_a$ and $T_{ab}$ are phase-shifted by an angle of approximately 45 degrees. When at rest, rotor 1 is initially positioned at the point $S_1$ owing to torque $T_a$. When a voltage pulse is sent to the coil, the rotor moves toward $S_2$ under the effect of torque $T_{ab}$.

Ordinarily, the coil of a motor is fed by a voltage pulse of constant duration, as illustrated in FIG. 3. The duration of the pulse must be long enough to permit the motor to complete the step under unfavorable conditions such as a drop in the voltage of the battery, for example, or in the case of an increase of mechanical torque $T_m$. However, most of the time the motor is not loaded and operates at its rated voltage; hence the constant and sufficiently long duration constitutes a useless waste of energy under normal operating conditions.

FIG. 4*a* shows the current and the voltage applied to the coil of the motor according to the feeding method of the present invention, the motor not being loaded by any mechanical torque.

The pulse of chopped voltage of a total duration $T_7$ is formed of a partial pulse of duration $T_4$ and of eleven partial pulses of variable duration $T_{6i}$, preceded by intervals time $T_{51}$, $T_{52}$, . . . $T_{5i}$ of variable duration. The sequence of partial pulses takes places as follows: initially, the coil of the motor is fed by a constant-voltage pulse of duration $T_4$ of 0.8 ms, and the current in the coil increases from zero to the value $i_1$ (FIG. 4*a*), according to the voltage equation:

$$E=R\cdot i+L\cdot di/dt+k\cdot\Omega \quad (1)$$

wherein:

E=voltage applied
L=inductance
i=current
t=time
k=coupling factor expressing the variation of the mutual flux between the magnet and the coil
Ω=angular velocity.

After this first partial voltage pulse, i.e., starting from $t=T_4$, the coil of the motor is short-circuited. The current in the coil varies, from that moment on, according to the equation:

$$O=R\cdot i+L\cdot di/dt+k\cdot\Omega \quad (2)$$

When this current drops to a reference value $I_{ref}$ (FIG. 5), i.e., at the moment $t=T_4+T_{51}$, the coil is again fed by a second partial constant-voltage pulse of duration $T_{61}$ equal to the short-circuiting duration $T_{51}$ preceding it. The current in the coil during the duration $T_{61}$ increases from the value $I_{ref}$ to the value $i_2$, and the coil of the motor is once more short-circuited at the moment $t=T_4+T_{51}+T_{61}=T_4+2\cdot T_{51}$, and so on. For this state of operation, i.e., when the motor is not loaded, the total duration $T_7$ of the chopped pulse is 4.8 ms, and the power consumption of the motor is 0.65 μAs. The value of $I_{ref}$ is, for example, 150 μA.

FIG. 4*b* shows the current and voltage applied to the motor according to the same feeding method as that of FIG. 4*a*, but the motor is loaded by a mechanical torque of 0.2 μNm. The total duration of the pulse $T_7$ passes from 4.8 ms in the previous case to 10.8 ms in the present case, and the power consumption of the motor in the present case is 1.7 μAs. Thus there is an automatic adaptation of the total duration of the pulse as a function of the load on the motor, and it is this adaptation which allows the inventive feeding method to save on the power supplied by the battery.

FIG. 5 shows the variation in the current during the time interval $T_{5i}$ separating two partial voltage pulses. Since the coil of the motor is short-circuited during this interval, the result starting from equation (2) is consequently:

$$T_{5i} = \frac{L\,\Delta i}{R\cdot i_m + k\cdot\Omega} \quad (3)$$

Equation (3) shows that the duration of time interval $T_{5i}$ depends upon the speed of rotation of the motor. An increase in the mechanical torque of the motor causes a reduction of the speed of rotation Ω, which will bring about an increase of interval $T_{5i}$.

The total duration $T_7$ of the chopped pulse is given by $$T_7 = T_4 + 2\cdot\sum_{i=1}^{n} T_{5i} \quad (4)$$

In this equation, n stands for the total number of partial pulses of duration $T_{6i}$ (n=11 in the example illustrated in FIGS. 4*a* and 4*b*).

Equations (3) and (4) provide the explanation for the adaptation of the pulse length as a function of the load by the feeding method proposed according to the present invention.

FIG. 6 is a block diagram of a control circuit according to one embodiment of the inventive method. A time-base signal coming from an oscillator Q is transmitted to a divider and pulse-shaper circuit 10, at the output of which the feeding period $T_o$ of oscillator Ω and the base period $T_B$ of oscillator Ω are obtained. Signals $T_o$, $T_B$, and a signal C at the output of a comparator 12 are transmitted to a logic circuit 11 which supplies control signals $D_1$, $D_2$, $D_3$, $D_4$ to the output stage (driver) 14.

A multiplier r is connected in series to the motor M at the output of driver 14, and a measuring unit 13 converts the voltage at the terminals of multiplier r into a signal giving the image of the current i before transmitting it to comparator 12.

FIG. 7 is a diagram of a possible design of block 11 of the preceding block diagram, FIG. 6. Base period $T_B$ of the quartz crystal and feeding period $T_o$ of oscillator Ω are supplied to inputs CP and $T_o$ of a counter 20. This counter establishes the width of the first partial pulse of duration $T_4$. The output of counter 20 is connected to one of the two inputs of an OR-gate 21. The output of OR-gate 21 actuates the counting function of an up-and-down counter 22. Signal C coming from comparator 12 (FIG. 6) simultaneously actuates the counting-down function of up-and-down counter 22 and setting (S) of a flip-flop D 24. Resetting (R) of flip-flop D 24 is controlled through OR-gate 23 by the output signals of counter 20 and an end-of-counting-down signal F from up-and-down counter 22. The output $Q_D$ of flip-flop D passes through a conventional logic circuit 25 to supply control signals $D_1$, $D_2$, $D_3$, $D_4$.

The function consisting in short-circuiting the coil of the motor during the intervals between the pulses is well known. Swiss Patent No. 634,194, already cited above, explains the effects of this function. An example of a circuit controlling such a function may be found in European Patent Application Publication No. 0 077 293, for instance.

FIG. 8 shows driver 14 of the block diagram, FIG. 6, in detail. Output transistors 31, 32, 33, 34 are mounted in an H-bridge and controlled by signals $D_1$, $D_2$, $D_3$, $D_4$ coming from circuit 25.

It will be noted that up-and-down counter 22 is designed to determine the number n (in the example of FIG. 4*a* and 4*b*, n=11) of the second partial pulses, so that the total duration of each chopped pulse is thus determined by the load conditions of the motor. It may further be provided for the circuit to interrupt the sequence of elementary second pulses when the duration of the intervals of time $T_{5i}$ exceeds a maximum $T_{ref}$.

What is claimed is:

1. A method of feeding a single-phase stepping motor for a timepiece, said stepping motor having a coil, comprising:
   measuring at least one load condition of the motor and a feed voltage of the motor;
   determining chopped-voltage pulses of variable duration ($T_7$) as a function of the at least one load condition and as a function of the feed voltage of the motor; and
   driving the motor with said pulses, wherein each pulse of chopped voltage is composed of a first partial voltage pulse ($T_4$) of predetermined duration and of a train formed of a number (i) of second partial voltage pulses ($T_{6i}$) of the same polarity as that of the first partial pulse and of variable durations, intervals of time ($T_{5i}$) separating said partial voltage pulses, said intervals being variable as a function of the at least one load condition and as a function of the feed voltage of the motor, and the duration of each second partial pulse ($T_{6i}$) being equal to the interval of time ($T_{5i}$) which immediately precedes each second partial pulse.

2. The method of claim 1, wherein the coil of the motor is short-circuited during said intervals of time $T_{5i}$.

3. The method of claim 1, wherein the coil of the motor is short-circuited during said intervals of time $T_{5i}$, each said interval of time $T_{5i}$ being delimited by the end of a said partial pulse of duration $T_4$ or of duration $T_{6i}$ and by the moment following this end when the current of the coil of the motor is equal to or less than a reference value $I_{ref}$.

4. The method of claim 1, wherein the coil of the motor is short-circuited during said intervals of time $T_{5i}$, each said interval of time $T_{5i}$ being delimited by the end of a said partial pulse of duration $T_4$ or of duration $T_{6i}$ and by the moment following this end when the current of the coil of the motor is equal to or less than a reference value $I_{ref}$, and said chopped pulse being composed of a constant number of partial pulses.

5. The method of claim 1, wherein the coil of the motor is short-circuited during said intervals of time $T_{5i}$, each said interval of time $T_{5i}$ being delimited by the end of a said partial pulse of duration $T_4$ or of duration $T_{6i}$ and by the moment following this end when the current of the coil of the motor is equal to or less than a reference value $I_{ref}$, and said train of second partial voltage pulses being interrupted when said interval of time $T_{5i}$ exceeds a reference value $T_{ref}$.

6. The method of claim 1, wherein the coil of the motor is short-circuited during said intervals of time $T_{5i}$, each said interval of time $T_{5i}$ being delimited by the end of a said partial pulse of duration $T_4$ or of duration $T_{6i}$ and by the moment following this end when the current of the coil of the motor is equal to or less than a reference value $I_{ref}$, and the coil of the motor being short-circuited between two said chopped pulses.

7. The method of claim 1, wherein the coil of the motor is short-circuited during said intervals of time $T_{5i}$, each said interval of time $T_{5i}$ being delimited by the end of a said partial pulse of duration $T_4$ or of duration $T_{6i}$ and by the moment following this end when the current of the coil of the motor is equal to or less than a reference value $I_{ref}$, said chopped pulse being composed of a constant number of partial pulses, and the coil of the motor being short-circuited between two said chopped pulses.

8. The method of claim 2, wherein two successive chopped pulses of duration $T_7$ are determined so as to be of the same polarity.

9. The method of claim 2, wherein two successive chopped pulses of duration $T_7$ are determined so as to be of opposite polarities.

10. A control circuit for a single-phase stepping motor comprising:
   a plurality of feeding terminals;
   a plurality of motor terminals;
   a plurality of switches;
   connection means including said switches for connecting the motor terminals to the feeding terminals, wherein the connection means commutates the motor between an off-state and at least one on-state by controlling the states of the switches;
   time counting means for providing main pulse periods succeeding one another with a fixed frequency and auxiliary periods having a predetermined length, this predetermined length being a fraction of the length of the main pulse periods;
   a sensor used for sensing a load parameter of the motor;
   a comparator coupled to the sensor whereby the comparator provides a signal for commutating the motor to the on-state when a threshold value exceeds the load parameter; and
   controller means operatively coupled to the switches and to the comparator for providing a plurality of elementary pulses during each of the main pulse periods, the elementary pulses comprising a first elementary pulse having a length which is that of the auxiliary periods, and a predetermined number of second elementary pulses separated from one another and from the first elementary pulse through time intervals, these time intervals having a variable length determined by the comparator, said second elementary pulses having each a length equal to the preceding time interval, the motor being in an on-state during each of the first and second elementary pulses and being in an off-state during the aforementioned time intervals and during a residual period of the main pulse period, between the end of the last one of the second elementary pulses and the beginning of the next first elementary pulse.

* * * * *